No. 771,316. PATENTED OCT. 4, 1904.
C. H. MELVIN.
WHEELED PLOW.
APPLICATION FILED FEB. 15, 1904.
NO MODEL. 3 SHEETS—SHEET 1.
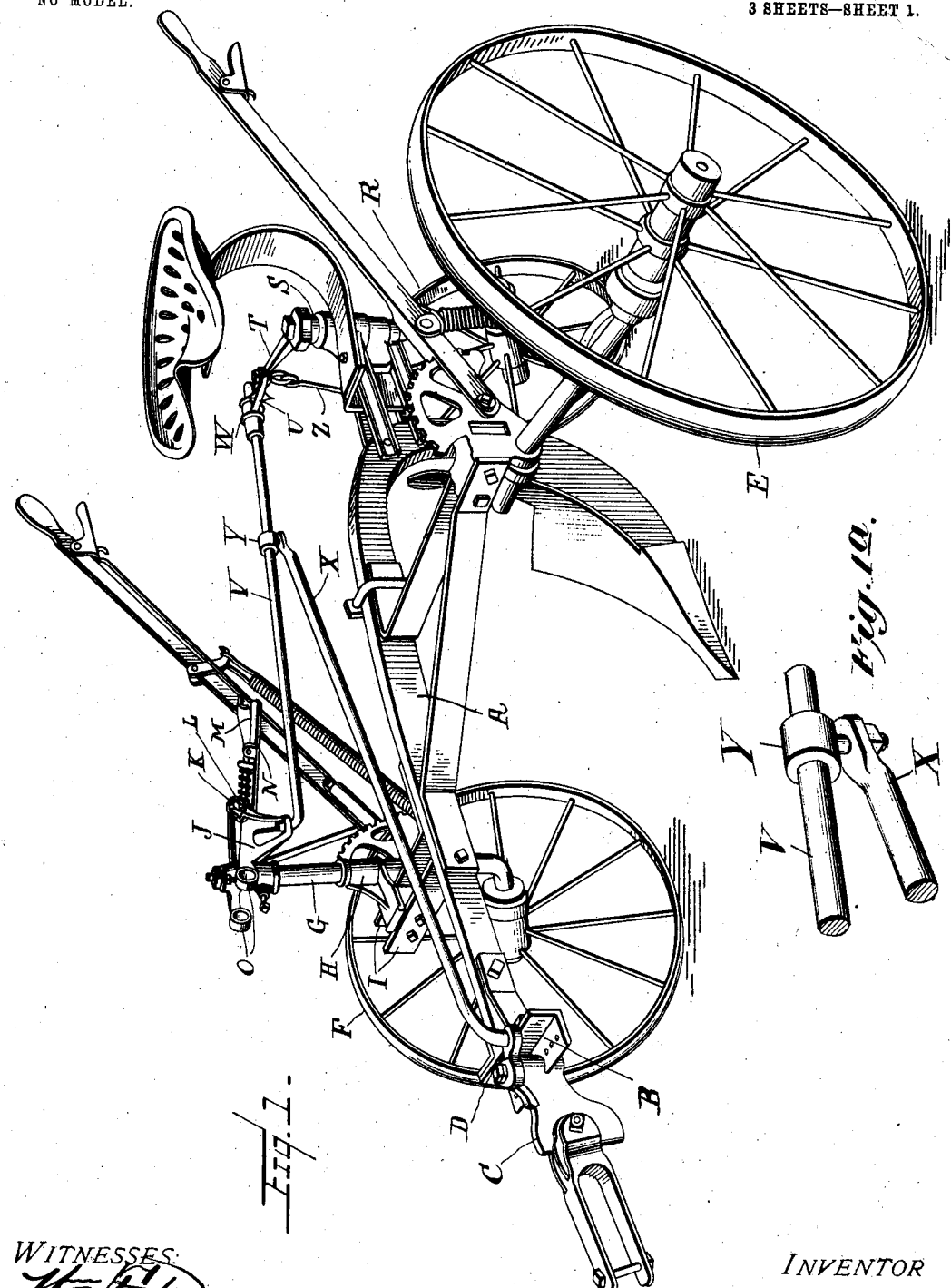
WITNESSES:
INVENTOR
Charles H. Melvin
BY
his Attorneys.

No. 771,316. PATENTED OCT. 4, 1904.
C. H. MELVIN.
WHEELED PLOW.
APPLICATION FILED FEB. 15, 1904.
NO MODEL. 3 SHEETS—SHEET 2.
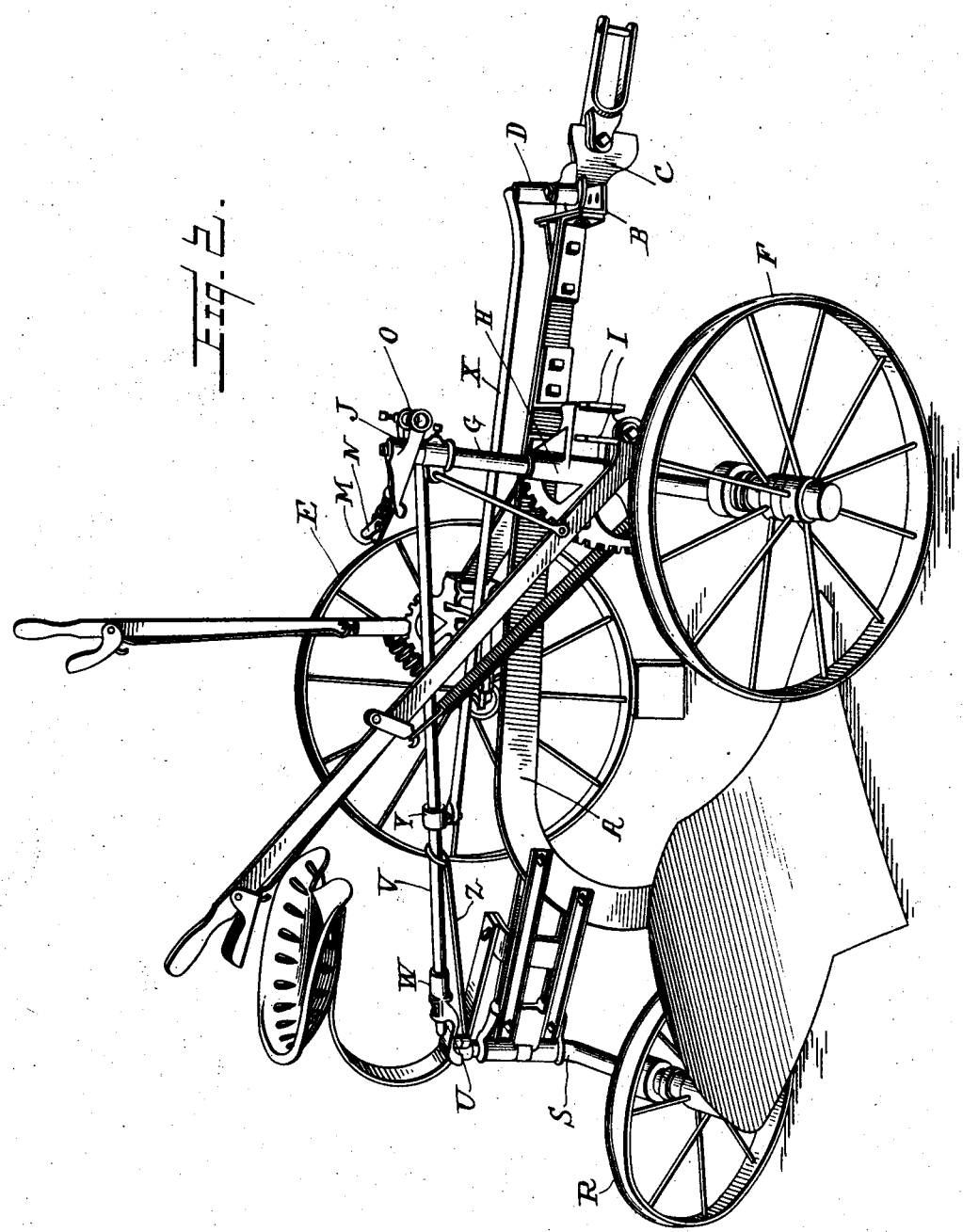
WITNESSES
Wm F. Doyle.
S. E. Dallinger
INVENTOR
Charles H. Melvin
BY
his Attorneys

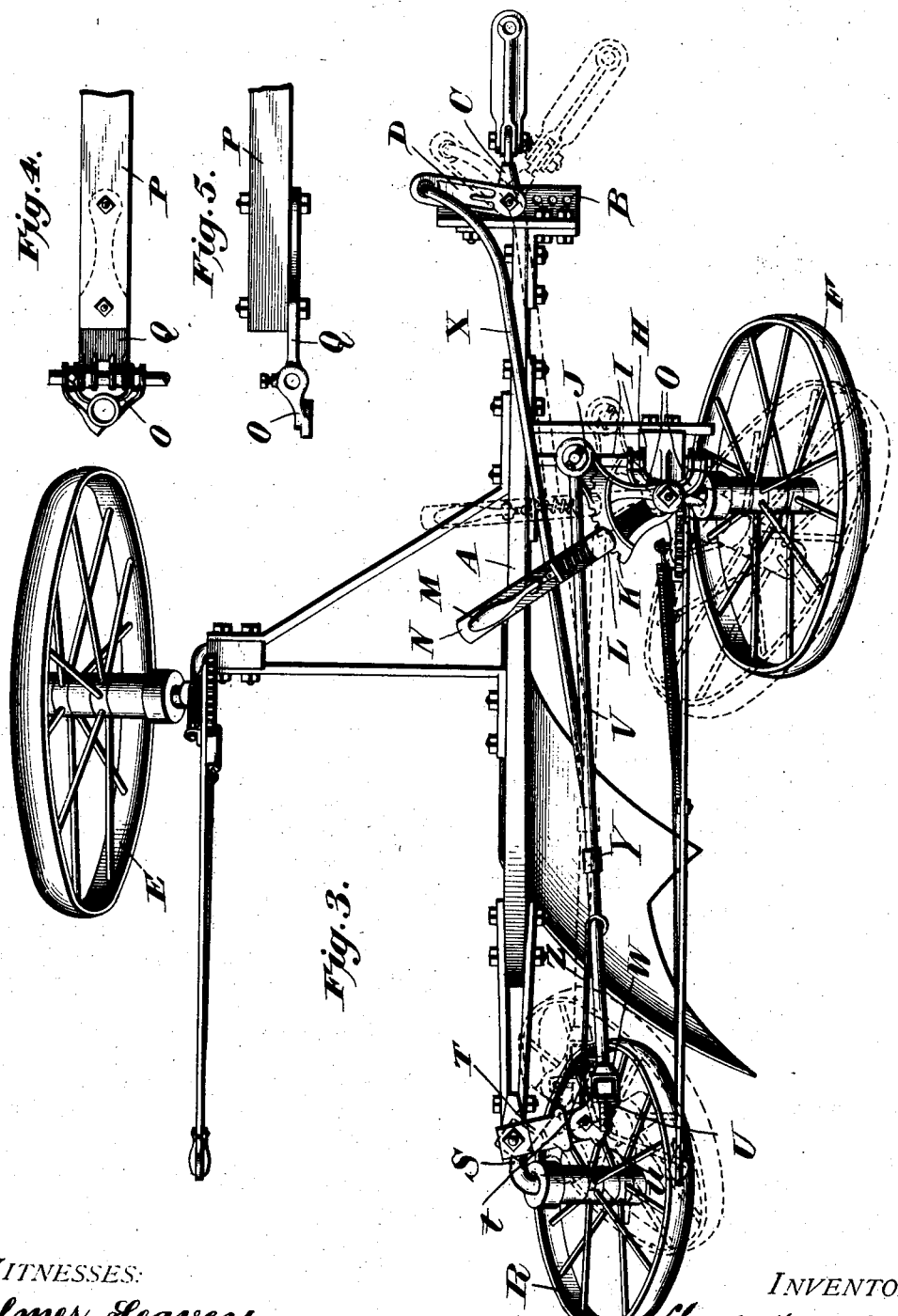

No. 771,316.

Patented October 4, 1904.

UNITED STATES PATENT OFFICE.

CHARLES H. MELVIN, OF MOLINE, ILLINOIS, ASSIGNOR TO DEERE AND COMPANY, OF MOLINE, ILLINOIS, A CORPORATION OF ILLINOIS.

WHEELED PLOW.

SPECIFICATION forming part of Letters Patent No. 771,316, dated October 4, 1904.

Application filed February 15, 1904. Serial No. 193,707. (No model.)

*To all whom it may concern:*

Be it known that I, CHARLES H. MELVIN, a citizen of the United States, residing at Moline, in the county of Rock Island and State of Illinois, have invented certain new and useful Improvements in Wheeled Plows; and I do hereby declare the following to be a full, clear, and exact description of the invention, such as will enable others skilled in the art to which it appertains to make and use the same.

This invention relates to three-wheeled plows, particularly to means for regulating the furrow-wheels by the draft whereby a change in direction of the draft alters the angles of the wheels in turning the plow.

The principal objects of the invention are to obtain proper control of the wheels for turning them by the draft, whether the implement is used either with or without a tongue; to provide improved connections between the draft and both the front and rear furrow-wheels, whereby the angles of both wheels will be regulated properly on turning the team; to mount the wheels and arrange such connections so as to permit a short turn of the implement by the natural draft of the team when pulled in the desired direction; to provide, in connection with such wheel-regulating devices, means for setting the front and rear furrow-wheels at any desired relation to each other and also with desired relation to the draft; to permit lateral adjustment of the front furrow-wheel and also of the attachment of the draft without interfering with such wheel-regulating connections; to prevent castering of the rear furrow-wheel farther than the direction desired; to provide a simple brake device for use with the implement when going downhill and when used without a tongue, and to produce a generally-improved and efficient implement of the character mentioned.

In the accompanying drawings, which are to be taken as a part of this specification, the invention is represented embodied in a wheeled plow of ordinary style carrying a regular turning-plow as the furrow-opener. The general form of the implement and particular type of furrow-opener are, however, immaterial to the present invention, for it is capable of embodiment in implements of various constructions carrying turning-plows, disks, or other tillage devices, either singly or in gang arrangement, while it is also susceptible of various modifications in details of construction and arrangement of parts. Without limiting myself to the construction shown, therefore, the following description of the illustrated implement will serve to explain fully the invention, which will then be defined more particularly in the annexed claims.

In said drawings, Figure 1 is a perspective view of a wheeled plow embodying my invention looking toward the landside of the implement. Fig. 1ª is a detail perspective view of the swivel adjustable connection between the links X and V. Fig. 2 is a similar view looking toward the opposite side. Fig. 3 is a top plan view of the implement, showing the position and relation of parts when the plow is drawn straight forward, with dotted lines indicating the position of parts when the team is turning to the right. Figs. 4 and 5 are respectively a plan and side view of the tongue or pole attachment.

The implement illustrated in the drawings is adapted to be drawn either by a tongue or pole or by attachment of the team directly to a clevis. It is shown without a tongue, but having a clevis C pivotally attached to a transverse plate B at the front of the main plow-beam A.

The frame of the implement, comprising the beam A and suitable brackets or members for attachment of the bearings of the wheel-spindles, is shown supported upon the usual landwheel E, front furrow-wheel F, and rear furrow-wheel or caster-wheel R. The front and rear wheels F and R are mounted on axles carried by the usual vertical or upright spindles G and S, respectively, journaled in suitable bearings which allow said spindles to turn therein to alter the angles or directions of the wheels. The bearing H of the spindle G is shown adjustably secured between parallel bars or arms I, projecting laterally from the beam A, which permits the usual lateral adjustment of the front furrow-wheel.

Rigid with the front wheel-spindle G is an arm J, shown projecting inwardly and having a segment-rack K, which is engaged by a spring-actuated bolt or locking device L, connected to a retracting handle or auxiliary lever M on a lever N, which is fulcrumed to the spindle G. This arm J is also shown integrally formed with a bifurcated arm O, in which a tongue or pole may be attached, if desired. As before stated, the implement is represented without a tongue; but in Figs. 4 and 5 is shown the rear end of a tongue or pole P, having its end or pole casting Q secured in the bifurcated arm O by a pin or bolt.

Rigid with the rear wheel-spindle S is an arm T, shown projecting oppositely to the arm J and pivotally connected to said arm J by a link V, which causes both spindles to turn together, though in opposite directions. This link is shown pivotally attached to the arm J at the front, while at its rear end it is adjustably secured, as by means of a threaded connection W, to a short member U, which is pivoted to the arm T. The arms J and T can be set in desired relation by adjustment of the link V in the screw-coupling W. When in use, any desired set of the front and rear wheels with relation to each other can be obtained by means of the segment-rack K, lever N, and locking-bolt L. At the rear end of the member U is a lug $u$, which when the link V is pulled forward by turning of the front wheel to the right swings around until it abuts a stop $t$ on the arm T, when the arm T and member U are practically in line with the link V, in which position the parts are locked together, and the rear wheel is thus prevented from turning beyond the desired point.

The link V is shown connected by a link X with an arm D, rigid or integral with the clevis-bolt. Said link X is pivotally attached to said arm D, while it is adjustably and pivotally secured to the link V, as by means of a clip or collar Y, having a bolt or screw inserted through an eye in the end of the link X. The connection of the link X in this manner permits adjustment of the clip along the link V and a free swivel movement of the link X with respect thereto.

From this description it will be seen that when the team is turned the angles or directions of the front and rear wheels are also properly changed, though in opposite directions—that is, while the front wheel turns with the draft the rear wheel turns oppositely—thus permitting an easy as well as a short quick turn of the implement. The operation of the several connections is clearly indicated in Fig. 3, where the full lines show the positions and relations of parts when the plow is drawn straight forward, while the dotted lines represent the positions and relations of parts when the team is turned to the right.

In addition to the various useful features before mentioned it will be noted that these wheel-regulating connections do not interfere with lateral adjustment of the clevis. The plate B is shown provided with a number of holes, to any one of which the clevis may be secured to give the plow the required position toward or from the land by properly adjusting the connection Y. Nor do such wheel-regulating connections interfere with lateral adjustment of the front furrow-wheel F, the spindle-bearing H of which may be bolted in desired position by adjusting the link V or by adjusting the lever N with respect to the arm J.

The description thus far given has had reference more especially to the implement when used without a tongue and when drawn by hitching the team to the clevis C. When so used, in order to compensate for the absence of the holdback afforded usually by the tongue a rod Z is shown loosely suspended from the arm T and having a hooked end engaging the link V. When going downhill, the rod is disengaged from the link V and is hooked to one of the spokes of the rear wheel, thus stopping rotation of said wheel and serving as a brake.

When it is desired to use a tongue or pole, this may be attached to the arm O on the front spindle, as represented in Figs. 4 and 5, and the link X may then be dispensed with.

Having thus fully described my invention, what I claim as new, and desire to secure by Letters Patent of the United States, is—

1. A wheeled plow having, in combination, a furrow-opener-supporting frame, front and rear supporting-wheels therefor mounted on pivotal axles having vertically-disposed spindles, laterally-projecting arms on said spindles, a link pivotally and adjustably connecting said arms, causing said wheels to turn or change their angular positions together, and a laterally-swinging draft-clevis connected to such linked arms so as to guide and adjust the wheels by the direction of travel of the team.

2. A wheeled plow having, in combination, a furrow-opener-supporting frame, front and rear supporting-wheels therefor mounted on pivotal or swinging axles, a link pivotally connecting such axles to cause them to turn in unison, means connected with such link for limiting the turn of the rear axle, and a laterally-swinging draft device connected to such linked axles to guide and adjust the wheels by the draft.

3. A wheeled plow having, in combination, a furrow-opener-supporting frame, front and rear supporting-wheels therefor mounted on pivotal axles having vertically-disposed spindles, oppositely-projecting arms on said spindles, a link pivotally connecting said arms, means limiting the pivotal movement of said link with respect to one of such arms, and a laterally-swinging draft device connected to such linked arms so as to guide and adjust the angles of the wheels by the direction of travel of the team.

4. A wheeled plow having, in combination, a furrow-opener-supporting frame, front and rear supporting-wheels therefor mounted on pivotal axles having vertically-disposed spindles, arms rigid on said spindles, a link pivotally connecting said arms, means limiting the pivotal movement of said link with respect to one of such arms comprising a lug carried by one of said parts and a coacting stop therefor on the other, and a laterally-swinging draft device connected to such linked arms so as to guide and adjust the angles of the wheels by the direction of travel of the team.

5. A wheeled plow having, in combination, a furrow-opener-supporting frame, front and rear supporting-wheels therefor mounted on pivotal axles having vertically-disposed spindles, arms rigid on said spindles, a link pivotally connecting said arms and adapted when the implement is turned in its regular direction to pull the rear arm in the direction of its length, a lug or projection carried by the link and a stop on the rear arm adapted to abut the same when the link is thus pulled forward, and a draft device connected to such linked arms to guide and adjust the wheels by the draft.

6. A wheeled plow having, in combination, a furrow-opener-supporting frame, front and rear supporting-wheels therefor mounted on pivotal axles having vertically-disposed spindles, oppositely-projecting arms on said spindles, a link pivotally attached to the front arm, a member adjustably coupled to said link and pivotally attached to the rear arm, said member having a lug adapted to abut a stop on the rear arm when the link is moved forward, and a laterally-swinging draft device connected to such linked arms so as to guide and adjust the wheels by the draft.

7. A wheeled plow having, in combination, a furrow-opener-supporting frame, front and rear supporting-wheels therefor angularly adjustable and having vertically-disposed spindles, arms on said spindles, a link pivotally connecting such arms, a laterally-swinging clevis, an arm adapted to swing with the clevis, and a link pivotally connecting said arm with the first-mentioned link.

8. A wheeled plow having, in combination, a furrow-opener-supporting frame, front and rear supporting-wheels therefor angularly adjustable and having vertically-disposed spindles, arms on said spindles, a link pivotally connecting such arms, a laterally-swinging and laterally-adjustable clevis, an arm adapted to swing with the clevis, and a link pivotally connecting said arm with the first-mentioned link.

9. A wheeled plow having, in combination, a furrow-opener-supporting frame, front and rear supporting-wheels therefor mounted on pivotal axles having vertically-disposed spindles, arms on said spindles, links pivotally connecting said arms, an arm rigid with the front arm adapted for attachment of a draft-tongue or pole, and a clevis-bolt adapted for attachment of a clevis so as to turn with the clevis and having an arm adapted for pivotal connection with said link.

10. In a wheeled plow, the combination with the rear supporting-wheel having a pivotal axle on a vertically-disposed spindle, of a link connected with a laterally-swinging draft device and pivotally connected with an arm on said spindle, said link having a lug adapted to abut a stop on said arm when the link is pulled forward by turning the team in one direction.

11. A wheeled plow having, in combination, a furrow-opener-supporting frame, front and rear furrow-wheels angularly adjustable and having vertically-disposed spindles, an arm connected with the front spindle, an arm connected with the rear spindle for turning it, a link pivotally connecting said arms, means limiting the pivotal movement of the link with respect to the rear arm, and a laterally-swinging draft device connected to such linked arms, to guide and adjust the wheels by the draft.

In testimony whereof I affix my signature in presence of two witnesses.

CHARLES H. MELVIN.

Witnesses:
   CHAS. H. POPE,
   SCHILLER HORFORD.